(12) United States Patent
Sheppard et al.

(10) Patent No.: US 11,711,996 B2
(45) Date of Patent: Aug. 1, 2023

(54) HIGH SPEED AGRICULTURAL SEEDER

(71) Applicant: Morris Industries Ltd., Saskatoon (CA)

(72) Inventors: Clint W. Sheppard, Yorkton (CA); Bhaskar Paliwal, Saskatoon (CA); Mark R. Benko, Willowbrook (CA); Edwin Antony, Calder (CA)

(73) Assignee: Morris Industries Ltd., Saskatoon (CA)

( * ) Notice: Subject to any disclaimer, the term of this patent is extended or adjusted under 35 U.S.C. 154(b) by 443 days.

(21) Appl. No.: 16/856,119

(22) Filed: Apr. 23, 2020

(65) Prior Publication Data

US 2020/0337219 A1     Oct. 29, 2020

Related U.S. Application Data

(60) Provisional application No. 62/838,777, filed on Apr. 25, 2019.

(51) Int. Cl.
    *A01C 5/06*         (2006.01)
    *A01C 7/20*         (2006.01)
    *A01C 7/08*         (2006.01)

(52) U.S. Cl.
    CPC .............. *A01C 5/068* (2013.01); *A01C 5/062* (2013.01); *A01C 7/08* (2013.01); *A01C 7/205* (2013.01)

(58) Field of Classification Search
    CPC .......... A01C 5/068; A01C 7/203; A01C 7/205
    See application file for complete search history.

(56) References Cited

U.S. PATENT DOCUMENTS

| | | | | |
|---|---|---|---|---|
| 1,721,716 | A * | 7/1929 | Silver ...................... | A01C 5/06 |
| | | | | 172/459 |
| 2,118,180 | A * | 5/1938 | Ferguson ........... | A01B 63/1013 |
| | | | | 91/367 |
| 2,656,801 | A * | 10/1953 | Hansen ..................... | A01C 7/08 |
| | | | | 239/661 |
| 5,697,455 | A * | 12/1997 | Deckler ................. | A01C 5/062 |
| | | | | 172/624.5 |
| 5,724,902 | A * | 3/1998 | Janelle .................... | A01C 7/006 |
| | | | | 111/194 |
| 8,939,095 | B2 * | 1/2015 | Freed ................... | A01B 49/027 |
| | | | | 111/926 |
| 2016/0113191 | A1 * | 4/2016 | Rosengren ........... | A01C 21/005 |
| | | | | 701/50 |
| 2017/0367250 | A1 * | 12/2017 | Hagny ................... | A01B 15/16 |
| 2018/0139894 | A1 * | 5/2018 | Jagow .................... | A01C 5/068 |

\* cited by examiner

*Primary Examiner* — Alicia Torres
(74) *Attorney, Agent, or Firm* — Hovey Williams LLP

(57) ABSTRACT

A row unit for a high-speed agricultural seeder includes a leading system including an opener and a dispenser, a trailing system including a leveler and a packer, a primary force generator generating a primary force, and a packer force adjustment system generating a packer adjustment force. The primary force includes opener and trailing force portions that are transferred to the opener and trailing system, respectively. The trailing force portion includes a leveler force portion that is transferred to the leveler and a packer force portion that is transferred to the packer. The packer adjustment force is adjustable independently of the leveler force portion, such that a combined packer force equal to a sum of the packer force portion and the packer adjustment force is adjustable independent of the leveler force portion.

20 Claims, 9 Drawing Sheets

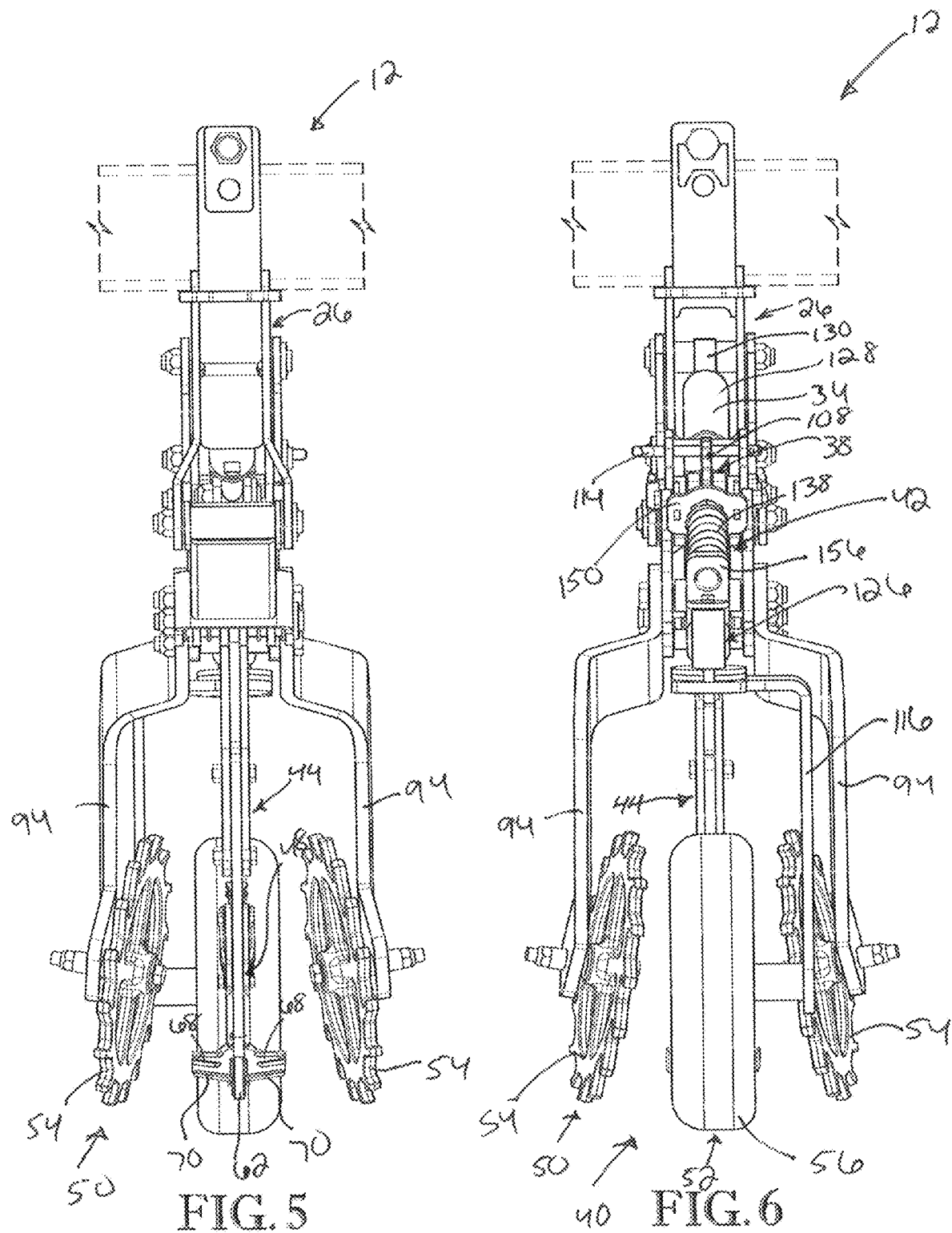

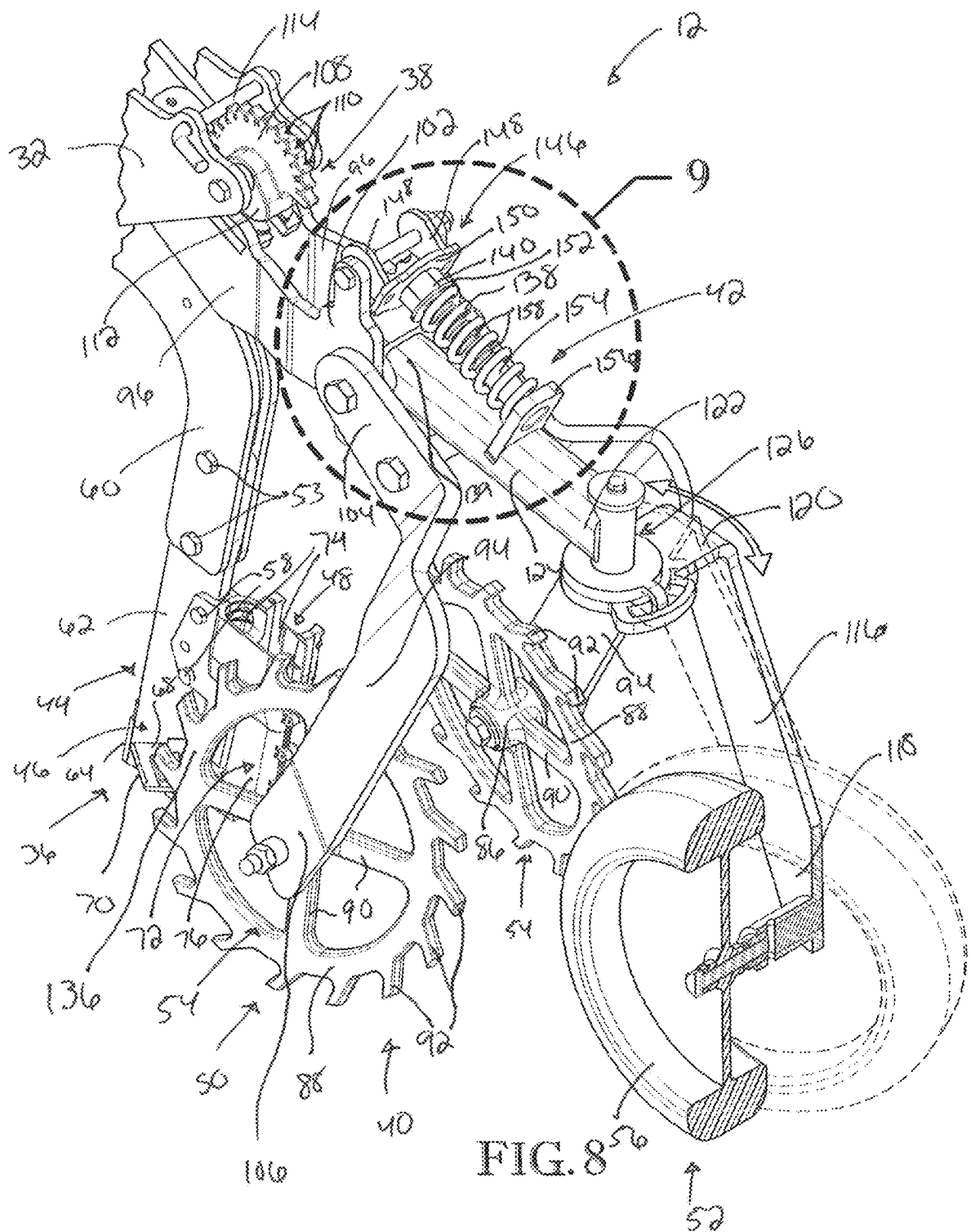

HIGH SPEED AGRICULTURAL SEEDER

CROSS-REFERENCE TO RELATED APPLICATION

This application claims the benefit of U.S. Provisional Patent Application Ser. No. 62/838,777, filed Apr. 25, 2019, which is hereby incorporated by reference in its entirety.

BACKGROUND OF THE INVENTION

1. Field of the Invention

The present invention relates generally to seeding machines, including seeding machines of a pneumatic type that are commonly referred to as air seeders.

2. Discussion of the Prior Art

Those of ordinary skill in the art will appreciate that seeders are commonly used in the agricultural industry to dispense particulate materials such as seeds and/or fertilizers into the ground.

SUMMARY

According to one aspect of the present invention, a row unit is provided for a high-speed agricultural seeder. The row unit is configured to dispense matter into soil while traveling in a forward direction across the ground. The row unit includes a leading system including an opener and a dispenser; a trailing system at least substantially disposed aft of the leading system, the trailing system including a leveler and a packer; a primary force generator configured to a generate a primary force; and a packer force adjustment system configured to generate a packer adjustment force. The opener is configured to create a trench in the ground by displacing soil. The dispenser is configured to thereafter dispense the matter into the trench. The leveler is configured to direct displaced soil back into the trench to cover the matter. The packer is configured to thereafter traverse and compact soil within the trench. The primary force is distributed through the leading system and the trailing system, such that an opener force portion of the primary force is transferred to the opener and a trailing force portion of the primary force is transferred the trailing system. The trailing force portion includes a leveler force portion that is transferred to the leveler and a packer force portion that is transferred to the packer. The packer adjustment force is adjustable independently of the leveler force portion, such that a combined packer force equal to a sum of the packer force portion and the packer adjustment force is adjustable independent of the leveler force portion.

Among other things, provision of both a primary force generator and a packer force adjustment system enables customizable force application across the opener, the leveler, and the packer for optimal performance in specific conditions dictated by, among other things, the preferred depth of planting or dispensation, the soil type (e.g., sandy, clay, loamy, etc.), the soil condition (e.g., moisture content, degree of packing, etc.), obstructions in the soil (e.g., as due to rocks, plant matter, etc.), and general variations in terrain (e.g., slopes, ridges, etc.).

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein:

FIG. 5 is a front view of the row unit of FIGS. 3 and 4;

FIG. 6 is a rear view of the row unit of FIGS. 3-5;

FIG. 8 is a rear perspective view of the row unit of FIGS. 8-10, particularly illustrating the pivoting nature of the packer wheel facilitated by its caster mount system;

Figure 1:
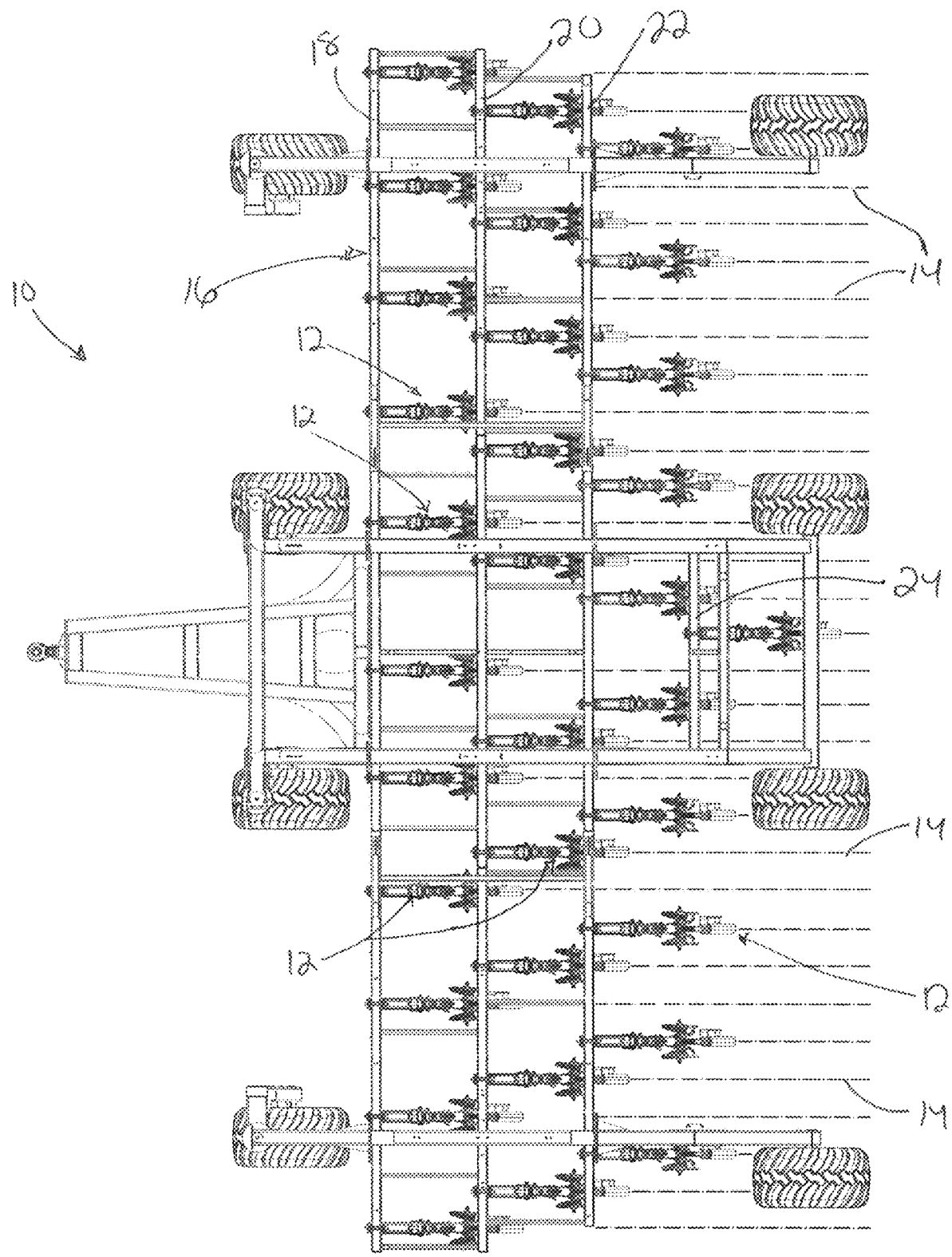
FIG. 1 is top view of a seeder in accordance with a preferred embodiment of the present invention.
Figure 2:
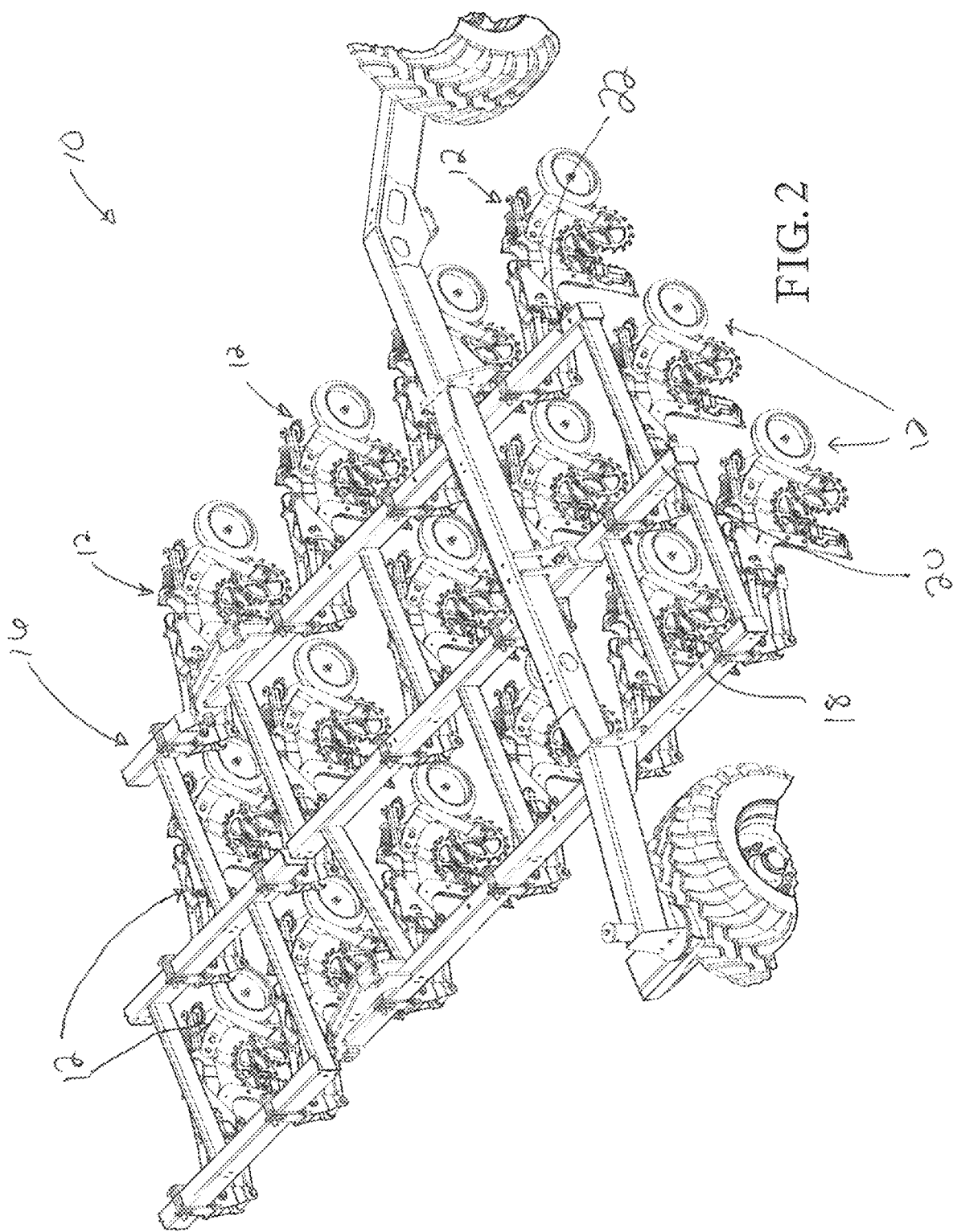
FIG. 2 is a perspective view of a portion of the seeder of FIG. 1.
Figure 3:
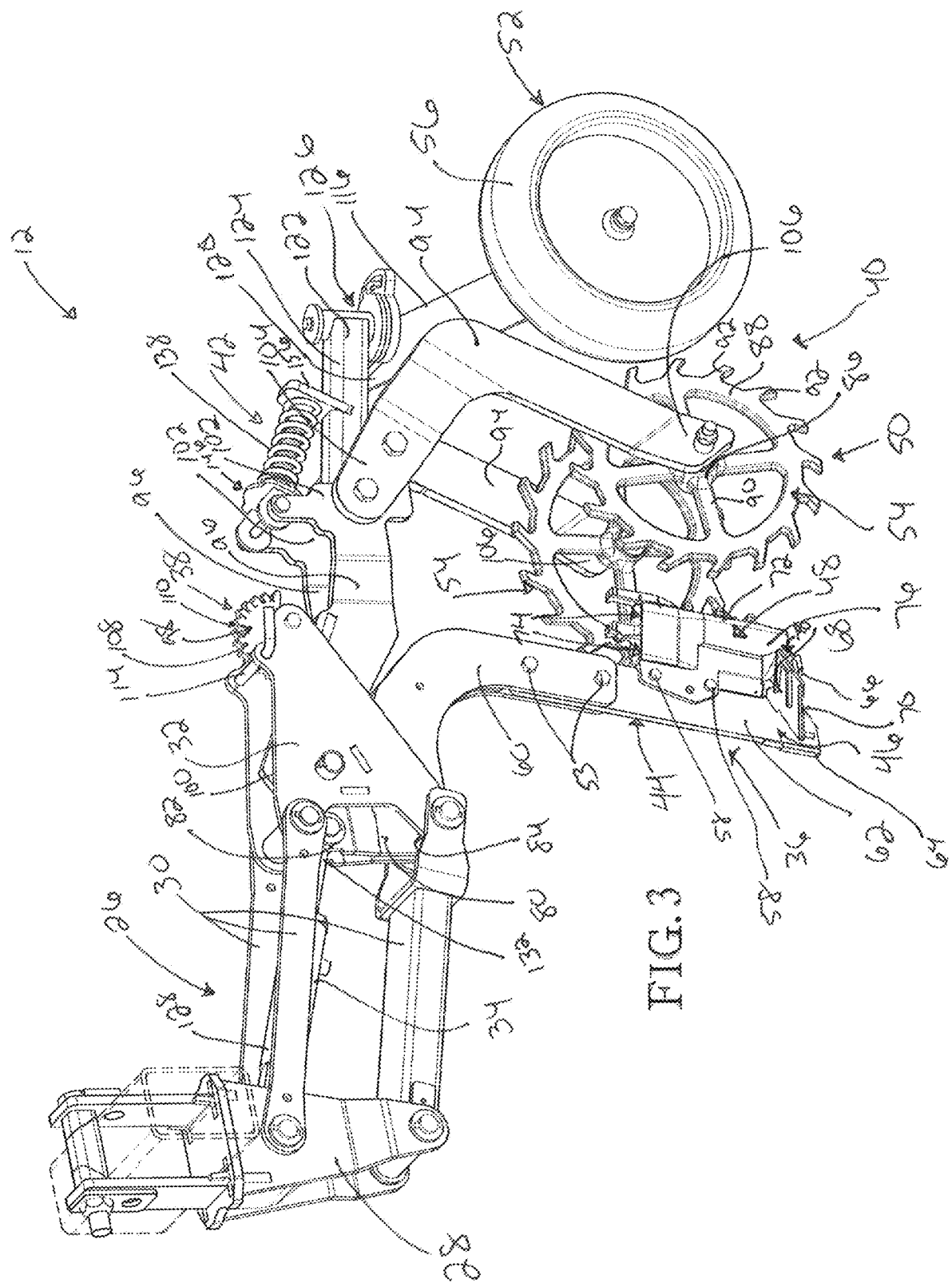
FIG. 3 is an enlarged perspective view of a single row unit of the seeder of FIGS. 1 and 2.
Figure 4:
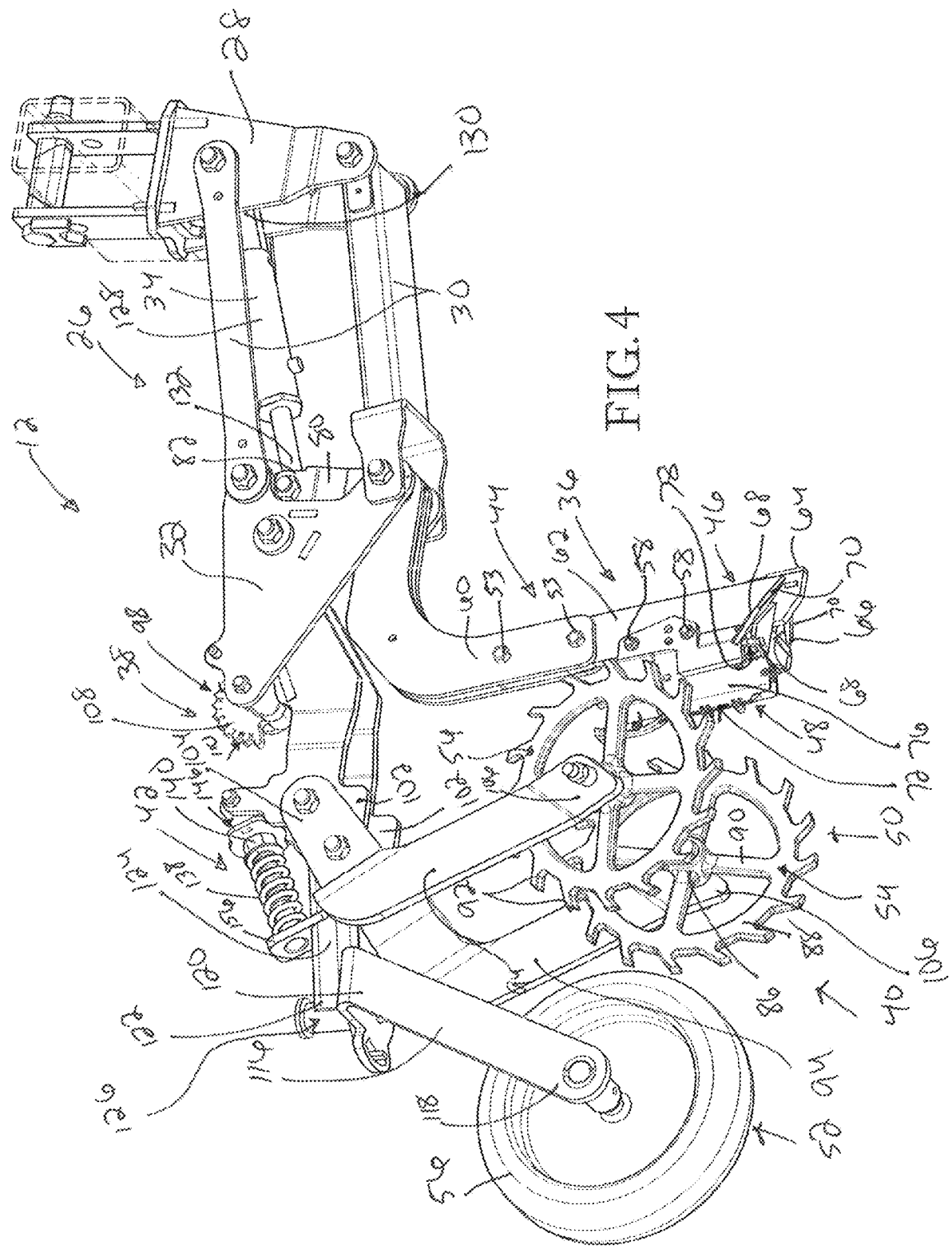
FIG. 4 is an alternate perspective view of the row unit of FIG. 3.

The drawing figures do not limit the present invention to the specific embodiments disclosed and described herein. While the drawings do not necessarily provide exact dimensions or tolerances for the illustrated structures or components, the drawings are to scale with respect to the relationships between the components of the structures illustrated in the drawings.

DETAILED DESCRIPTION

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Furthermore, unless specified or made clear, the directional references made herein with regard to the present invention and/or associated components (e.g., top, bottom, upper, lower, inner, outer, etc.) are used solely for the sake of convenience and should be understood only in relation to each other. For instance, a component might in practice be oriented such that faces referred to as "top" and "bottom" are sideways, angled, inverted, etc. relative to the chosen frame of reference.

Overview

Turning now to FIG. 1, an agricultural implement 10 is provided. The implement 10 is configured to be pulled or towed behind a vehicle (not shown) such as a tractor. The illustrated implement 10 is a planting implement or planter 10. More particularly, the planter 10 is an air drill or air seeder 10, although certain aspects of the present invention are applicable to other types of planters.

In a preferred embodiment, the seeder 10 is connectable to an air cart (not shown) or other receptacle(s) containing seeds, starter fertilizer, additional fertilizer, grain inoculant, and/or one or more other substances for insertion into soil. Such substances might be in granular, liquid, or high pressure gaseous form. Pneumatic lines (not shown) connected to blowers or other air sources preferably transport the desired substance or substances from the air cart to the seeder either individually or in combination. Metering may be performed by any appropriate metering device (such as a roller or gate) to ensure suitable rates and amounts of delivery. An example air cart and metering system well suited for use with the present invention is described in detail in U.S. Pat. No. 8,915,200, entitled SEEDER WITH METERING SYSTEM HAVING SELECTIVELY POWERED METERING SECTIONS, the entirety of which is incorporated by reference herein. It is permissible according to some aspects of the present invention, however, for other means of transfer from the receptable to the seeder to be utilized.

The seeder 10 is preferably configured for use in a variety of seeding applications, including both conventional and zero till applications. However, specialized or limited use seeders fall within the scope of some aspects of the present invention.

In a preferred embodiment, as shown in FIG. 1, the seeder 10 preferably comprises a plurality of row units 12 arranged to facilitate planting of evenly spaced rows 14 (shown schematically in FIG. 1).

In the illustrated embodiment, for instance, the seeder 10 includes a frame 16. The frame 16 includes three (3) main crossbars 18, 20, and 22, each defining left and right lateral ends 18a and 18b, 20a and 20b, and 22a and 22b, respectively. Five (5) row units 12 are spaced evenly along the left side of the first crossbar 18 starting from the left end 18a; five (5) row units 12 are spaced evenly along the left side of the second crossbar 20, each staggered slightly to the right of a corresponding one of the row units 12 disposed on the first crossbar 18; and another five (5) row units 12 are spaced evenly along the left side of the third crossbar 22, each staggered slightly to the right of a corresponding one of the row units 12 disposed on the second crossbar 20. Three (3) sets of five (5) row units 12 disposed on the right side of the frame 16 mirror the aforementioned row units 12 on the left side of the frame 16. A final left-side slot is filled by an additional row unit 12 mounted to the front crossbar 18, while a final right-side slot is filled by an additional row unit 12 mounted to a smaller frame cross-segment 24 disposed rearward of the third crossbar 22. Thus, thirty-two (32) row units 12 are provided in a space-efficient fore-aft envelope and with even lateral spacing therebetween. The principles of the present invention apply to seeders having any number of row units, however, with any spacing being permissible as well.

In a preferred embodiment, each row unit 12 broadly includes a framework 26 including a mounting bracket 28 for attachment to the main frame 16, a parallel linkage 30, and a central bracket 32. Each row unit 12 further preferably includes a primary force generator 34, a leading system 36, a depth adjustment assembly 38, a trailing system 40, and a packer force adjustment system 42. The trailing system 40 is at least substantially disposed aft of the leading system 36. (Fore and aft as used herein are in relation to the normal operational direction of travel of the towing vehicle across the ground and, in turn, the normal direction of travel of the implement or seeder 10 during a dispensation process such as planting and/or fertilizing.)

The leading system 36 broadly includes a shank 44 on which an opener 46 and a dispenser 48 are disposed. The trailing system 40 broadly includes a leveler 50 and a packer 52. In the illustrated embodiment, the leveler 50 comprises a pair of laterally spaced apart crumbler wheels 54. The packer 52 broadly comprises a packer wheel 56.

In a preferred method of operation, upon forward motion of the towing vehicle along the ground (i.e., soil) and subsequent forward motion of the implement or seeder 10, the opener 46 creates a trench (interchangeably referred to herein as a trough or furrow) in the soil by displacing a portion of the soil. The dispenser 48, having received matter from the previously described air cart or other receptacle, dispenses the matter into the trench. The crumbler wheels 54 of the leveler 50 direct the previously displaced soil back into the trench to cover the newly deposited matter, and the packer wheel 56 thereafter traverses the loose soil that was placed back in the trench so as to pack the soil and secure the matter therebelow.

Leading System Design

Turning now to the design of the leading system 36, most preferably, the opener 46 is at least in part integrally formed with the shank 44, whereas the dispenser 48 is fixed to the shank 44 via bolts 58 or other fasteners. Alternate designs making use of integral construction, overmolding, adhesives, fasteners, welding, and/or other techniques fall within the scope of the present invention, however.

In the illustrated embodiment, the shank 44 comprises upper and lower portions 60 and 62. The opener 46 and the dispenser 48 are preferably disposed solely on the lower portion 62. The lower portion 62 is most preferably removable and replaceable. Thus, a different opener and dispenser can easily be used with the same framework 26 and trailing system 40 if desired. In the illustrated embodiment, for instance, the upper and lower portions 60 and 62 are connected by bolts 63.

The opener 46 is preferably a hoe-type opener 46. More particularly, the opener 46 preferably includes a leading edge 64 for initially breaking the soil, a secondary edge 66 disposed aft of the leading edge 64, and a pair of wings 68 projecting laterally outwardly and aftward from the shank adjacent the leading edge 64. The wings 68 each preferably include forwardly disposed wing edges 70. The opener 46 is configured to cut a furrow or trough in the soil that is well suited both in depth and in shape for the given agricultural task at hand. For instance, the illustrated leading edge 64 is configured to cut a bottom portion of the trough. The wing edges 70 cooperate with the remaining portions of the wings 68 to form soil "shelves" adjacent and above the bottom portion of the trough. In an example operation, fertilizer might be dispensed into the bottom portion of the trough, while seeds are placed on the adjacent shelves. In this manner, seed toxicity due to direct fertilizer contact is avoided.

Some or all of the edges 64, 66, and 70 may be hardened, as illustrated, by means of a wear plate or coating. Treatments may also be provided to aid in reduction of sticking of soil (i.e., buildup) on the opener It is noted that other types of openers, including but not limited to disc-style openers or tine openers, may also be used without departing from the scope of some aspects of the present invention.

The dispenser 48 is preferably in the form of a boot 72 defining a plurality of passages 74. In the illustrated embodiment, for instance, the boot 72 comprises a molded body 76 defining two (2) passages 74. The passages 74 are each configured to receive a tube or line (not shown) that connects the passage 74 with the aforementioned air cart or other source of material. For instance, the passage 74 might be connected to a line providing liquid fertilizer to be dispensed into the bottom portion of the above-described trench, whereas the passage 74 might be connected to a line providing air-transported seed to be dispensed onto the above-described shelves.

It is noted that a variety of boot design variations to achieve desired material placement fall within the scope of the present invention. In the illustrated embodiment, for instance, the boot 72 includes laterally projecting ducts 78 that project from the passage 74 to dispense matter laterally (e.g., as onto shelves of the sort described previously herein).

Further details of the illustrated opener 46 may be found in U.S. Pat. No. 9,717,173, entitled MOLDED BOOT FOR DISPENSING SEEDS AND MULTIPLE TREATMENTS, the entirety of which is incorporated by reference herein.

In a preferred embodiment, the upper portion 60 of the shank 44 includes a generally vertically oriented attachment segment 80. As will be discussed in greater detail below, an upper end 82 of the attachment segment 80 is preferably secured to the primary force generator 34. As will also be discussed in greater detail below, a lower end 84 of the attachment segment 80 is preferably attached to the parallel linkage 30. The lower end 84 is further preferably attached to the central bracket 32.

Trailing System Design

The crumbler wheels 54 each preferably comprise an inner hub 86, an outer rim 88, a plurality of struts 90 extending between and interconnecting the hub 86 and rim 88, and a plurality of arcuately spaced apart teeth 92 projecting radially outwardly from the rim 88.

Each crumbler wheel 54 is preferably mounted to a crumbler arm 94. More particularly, the depth adjustment assembly 38 preferably includes a pair of depth gauge arms 96 and a depth adjustment cam 98. The depth gauge arms 96 preferably each include a proximal end 100 fixed to the central bracket 32 and a distal end 102 to which a respective one of the crumbler arms 94 is attached at an attachment end 104 thereof. Each crumbler arm 94 preferably further includes a wheel end 106 to which the respective crumbler wheel 54 is attached.

In a preferred embodiment, the depth adjustment cam 98 includes a toothed stopper 108 defining a plurality of discrete notches 110. An eccentric pusher or presser 112 is secured to the stopper 108 to share an axis therewith. A pin 114 extends through the central bracket 32 into the desired one of the notches to bias the depth gauge arm 96 and, in turn, the crumbler wheel 54 and the shank 44 (via its connection to the central bracket 32), into a desired vertical position. Shifting of the pin 114 into a different one of the notches results in rotation of the eccentric pusher 112 and a corresponding shift in the vertical position of the shank 44 and the crumbler wheel 54.

The crumbler wheel 54 is preferably designed to facilitate its use both for soil manipulation and depth gauging. With regard to soil manipulation, each crumbler wheel 54 is preferably angled upwardly and inwardly toward a vertical centerline. The inward tilting is such that soil contacting the crumbler wheels 54 is directed laterally inwardly toward the centerline or, in other words, thrown toward and into the previously formed trench.

In the illustrated embodiment, the crumbler wheels 54 are fixed in position such that the angle thereof is not readily adjusted. However, adjustable configurations fall within the scope of some aspects of the present invention. In such configurations, adjustments could be made based on the amount of desired deflection of the soil or based on the width and amount of disturbance caused by the opener 46. Any of a variety of adjustment means, including but not limited to angled bushings or other such mounting systems, fall within the scope of the present invention.

The teeth 92 of each crumbler wheel 54 are designed for smooth and consistent penetration of the ground, with the rims 88 preferably continually and consistently engaging an upper, uncut/undisturbed surface of the soil. The rims 88 and, more broadly, the crumbler wheels 54 therefore act as depth gauges for the row unit 12 and help maintain the desired seeding depth as ultimately dictated by the position of the opener 46. As will be discussed in greater detail below, the fore-aft proximity of the crumbler wheels 54 to the opener 46 and dispenser 48 facilitates meaningful depth gauging, with the gauging occurring proximate to the location of material dispensation.

The teeth 92 also are configured to break down soil clods and clumps, thereby providing better seed-to-soil contact as a result of the ensuant smaller final soil particle size.

It is permissible according to some aspects of the present invention, however, for the crumbler wheels 54 to be replaced with another type of wheel that is also suited both to provide depth flotation and to direct disturbed soil from the opener back into the furrow or trough to cover the seed or other dispensed matter.

The packer wheel 56 preferably comprises a semi-pneumatic tire, although other forms of a tire or wheel may be used without departing from the scope of the present invention. It is preferred that the material and/or inflation properties of the packer wheel be appropriate for the given soil type and planting requirements, however.

The packer wheel 56 is preferably rotatably mounted to a packer wheel arm 116. More particularly, the packer wheel arm 116 includes a lower end 118 to which the packer wheel 56 is attached and an upper end 120 that is pivotably mounted to a distal end 122 of a spring arm 124 that will be described in depth below. In still greater detail, the packer wheel arm 116 and the spring arm 124 are secured to one another via a caster system 126 such that the packer wheel arm 116 is pivotable about an axis generally orthogonal to the forward direction (most preferably a vertical axis).

Provision of the caster system 126 is highly advantageous, enabling the packer wheel 56 to pivot upon encountering a wad or ball of heavy residue (e.g., as might be present between row units 12 after dislodgement by the opener 46). This pivoting action helps the obstruction pass through rather than jamming up against the packer wheel arm 115 and/or wheel 56. The pivoting action also reduces stress on the row unit 12 during cornering. Still further, the pivoting action results in better furrow-following behind the shank 44.

Force Generation and Adjustments

As noted previously, each row unit 12 includes a primary force generator 34 and a packer force adjustment system 42. The primary force generator 34 in the illustrated embodiment comprises a hydraulic actuator or cylinder 128. However, it is permissible according to some aspects of the present invention for the primary force generator to additionally or alternatively comprise one or more of a pneumatic actuator, a spring, an air bag system, or another force-producing structure or assembly.

The hydraulic cylinder 128 preferably includes a fixed, proximal end 130 and an expandable/retractable distal end 132. The proximal end 130 is preferably fixed to the mounting bracket 28. The distal end 132, as noted previously, is preferably fixed to the shank 44. The primary force generator is configured to generate a primary force, with the magnitude of the primary force varying according to the position of the distal end 132.

As will be apparent to those of ordinary skill in the art upon inspection of the figures, the primary force generated by the primary force generator 34 is distributed in part to the leading system 36 and in part to the trailing system 40. Alternatively stated, the primary force is transmitted through the leading system 36 and the trailing system 40 in proportions to be discussed in greater detail below.

More particularly, an opener force portion of the primary force is transferred to the opener 46, and a trailing force portion of the primary force is transferred to the trailing system 40. The trailing force portion includes a leveler force portion that is transferred to the leveler 50 and a packer force portion that is transferred to the packer 52.

Preferably, a suitable magnitude for the primary force is determined by an operator of the implement 10 prior to commencement of an agricultural operation, with pressure of the hydraulic cylinder 128 being set accordingly. However, the operator may adjust the pressure of the hydraulic cylinder 128 as necessary over the course of an operation.

During a typical operation, for instance, the hydraulic cylinder 128 might be set to generate a constant pressure between about five hundred (500) psi and about twelve hundred (1200) psi. Pressures falling outside this preferred range fall within the scope of certain aspects of the present invention, however. It is also noted that appropriate operating pressures will vary in accordance with the bore size of the hydraulic cylinder.

As will also be apparent to those of ordinary skill in the art upon inspection of the figures, the primary force generated by the primary force generator 34 typically includes both vertical and horizontal components. More particularly, the primary force includes a horizontal trip force resistant against rearward or aftward ground forces (i.e., draft forces generated by the soil rearwardly against all points of contact) and a down force resistant against upward ground forces (e.g., as generated by the soil upward against all points of contact, including a soil penetration force at the opener 46 and a soil packing force at the packer wheel 56.)

It is particularly essential that the trip force include an opener trip force resistant to the aforementioned draft force applied by the ground to the opener 46. Should such draft force overcome the opener trip force and cause the shank 44 to swing backward, inappropriate trench depth (and resultant inappropriate seeding depth) would result, leading to poor outcomes from the operation.

The geometry of the row unit 12 determines the proportionality of the various force components drawn from the primary force. In a preferred embodiment, however, the geometry of the row unit 12 dictates that the opener trip force is equal to the hydraulic pressure of the primary force generator 34 divided by about one and six tenths (1.6).

In addition to the primary force, the weights of various components of the row unit 12 additionally provide down forces against the ground and other components.

As noted previously, the trailing force portion includes the leveler force portion that is transferred to the leveler 50 and the packer force portion that is transferred to the packer 52. In a broad sense, the trailing force portion is the force remaining after the leading force portion has been accounted for.

Most preferably, the leveler force portion of the trailing force portion is sufficient to enable driving engagement of the teeth 92 in the soil. This is in contrast to conventional designs, in which significant leveler force portions are typically avoided, thereby allowing the levelers to "float" along the soil surface. Enablement of "driven" crumbler wheels 54 aids in their effectiveness as multi-purpose components of the row unit 12. As noted previously, the crumbler wheels 54 preferably break down previously dislodged soil, return the soil into the respective trenches, and act as depth gauges. However, the crumbler wheels additionally preferably act as cleaners to remove debris and trash (e.g., stubble from a previous planting, etc.) from the corresponding opener 46 and/or boot 72.

In greater detail, each crumbler wheel 54 is preferably disposed close to the corresponding opener 46 and boot 72 so as to ensure depth gauging done by the crumbler wheel 54 is relevant to the corresponding opener 46 and dispenser 48 or boot 72, from which the seed or other substance is dispensed. Close positioning is also essential to enabling the cleaning function of each crumbler wheel 54. Most preferably, each dispenser 48 presents an aftmost dispenser margin 134. Each corresponding crumbler wheel 54 includes a cleaning portion 136 that extends forward of the aftmost dispenser margin 134 to overlap the dispenser 48 (and includes a continuously varying portion of the crumbler wheel 54 as the crumbler wheel 54 rotates). Trash or debris that is trapped between the boot or dispenser 48 (such debris in some instances having been initially dislodged by the opener 46) and the cleaning portion of the crumbler wheel 54 will, due to the driven rotation of the crumbler wheel 54 as facilitated by the sufficiently high leveler force, be actively and forcefully pulled away from the opener 46 and the dispenser 48.

Figure 7:
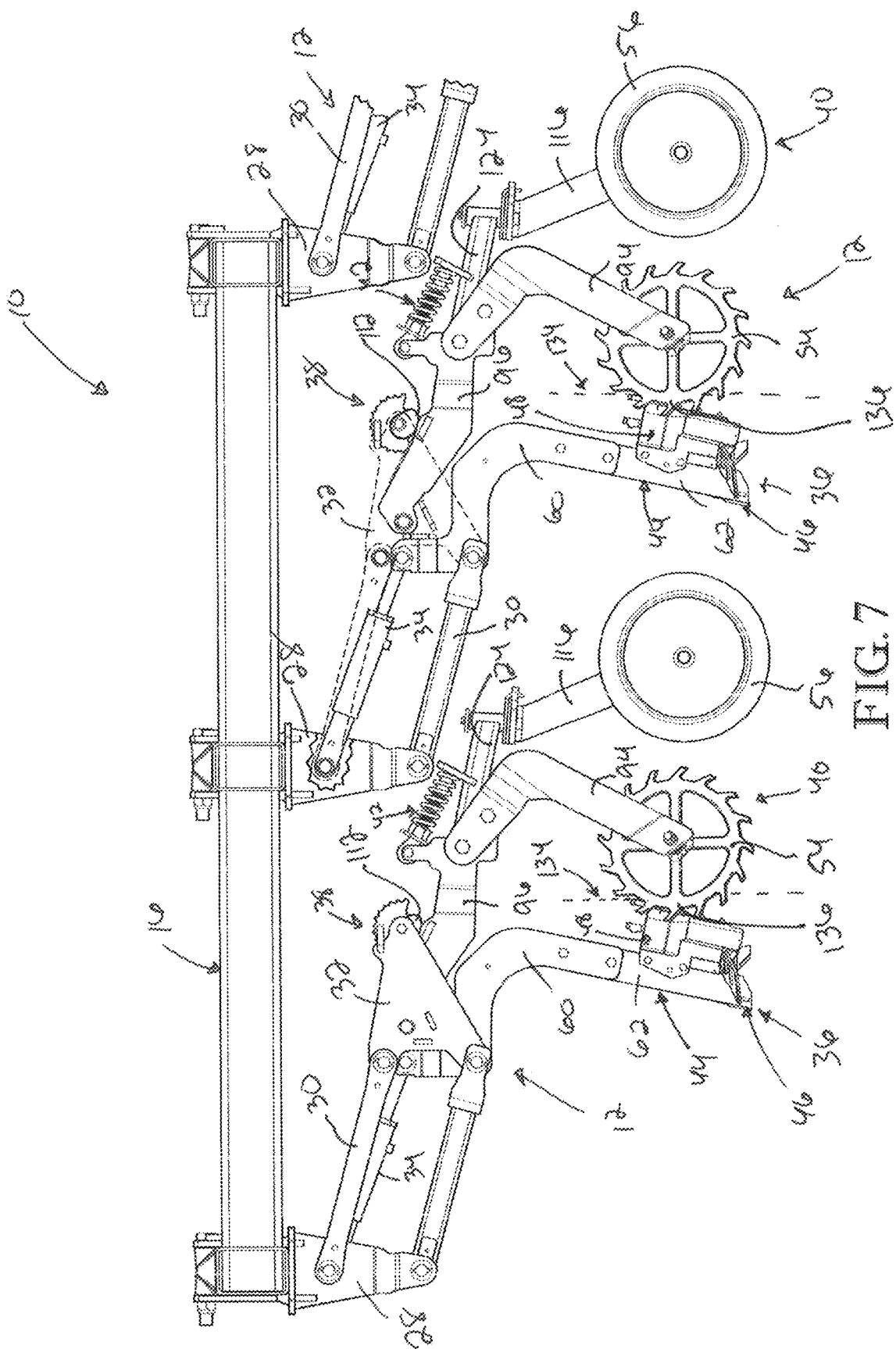
FIG. 7 is a side view of a pair of row units, with a portion of one row unit shown in hidden line to illustrate internal connections thereof.

In a preferred embodiment, the cleaning portion 136 of each crumbler wheel 54 is approximately defined by the depth of the teeth 92 (see FIG. 7), although some or all of the rim 88 might extend into the cleaning portion 136 as well in alternative preferred designs. Preferably, the fore-and-aft dimension of the overlapping portion defining the cleaning portion 136 is between about five percent (5%) and about twenty-five percent (25%) of the overall diameter of the crumbler wheel 54. More preferably, the cleaning portion dimension is between about ten percent (10%) and about fifteen percent (15%) of the crumbler wheel diameter. However, lesser and greater overlaps fall within the scope of some aspects of the present invention.

As noted previously, a packer force adjustment system 42 is provided to generate a packer adjustment force that, along with the packer force portion of the primary force, forms an overall or combined packer force that is applied to the packer wheel 56. (That is, the combined packer force is equal to the sum of the packer force portion and the packer adjustment force.)

In the illustrated embodiment, the packer force portion is about one third (⅓) of the opener trip force. In some applications, this is insufficient to achieve appropriate packing. In a conventional design, this deficiency must simply be tolerated, or the primary force must be adjusted as best possible to achieve a "good enough" opening force and packing. The packer force adjustment system 42 facilitates selective adjustment of the overall or combined packer force without any changes to the primary force.

Alternatively stated, the packer adjustment force is adjustable independently of the leveler force portion and the opener force portion, such that the combined packer force, equal to the sum of the packer force portion and the packer adjustment force, is adjustable independent of the leveler force portion and the opener force portion.

Thus, optimization of multiple row unit component forces may be achieved without affecting the others.

Preferably, the combined packer force is between about one hundred (100) lb and about two hundred (200) lb during operation of the seeder 10, although other magnitudes fall within the scope of some aspects of the present invention.

In a preferred embodiment, the packer force adjustment system 42 comprises a spring 138 and the previously mentioned spring arm 124 that supports the packer wheel arm 116 and the packer wheel 56. The spring arm 124 includes a proximal end 139 that is fixed to the distal ends 102 of the depth gauge arms 96. The spring 138 applies a spring force to the spring arm 124, wherein the spring force is proportional to a length L of the spring 138 along the axis thereof. As will be discussed in greater detail below, the packer wheel 56 is mounted relative to the spring arm 124 in such a manner that the spring force is at least in part transferred to the packer wheel 56 to comprise the packer adjustment force.

As will be also discussed in greater detail below, the length L of the spring 138 is preferably adjustable by means of a spring adjustment nut 140 and one or more shims 142 and 144 (see FIGS. 9b and 10). Rotation of the spring adjustment nut 140 varies the length L of the spring 138 and thereby adjusts the spring force generated by the spring 138. Other means for adjusting the spring length fall within the scope of the present invention, however.

In greater detail, the packer force adjustment system 42 additionally includes a mounting bracket 146 including a pair of arms 148 and a mounting plate 150. The adjustment system 42 further includes a washer 152, a rod 154, and a receiver 156. The arms 148 are preferably bolted to the respective distal ends 102 of the depth gauge arms 96. The arms 148 and the mounting plate 150 are preferably integrally formed or rigidly fixed to one another.

In the preferred, illustrated embodiment, the rod 154 is integrally formed with the mounting plate 150, although any interconnection that restricts relative movement along the direction of the axis of the rod 154 is permissible according to some aspects of the present invention. Welds or threads might be used, for instance.

Figure 10:
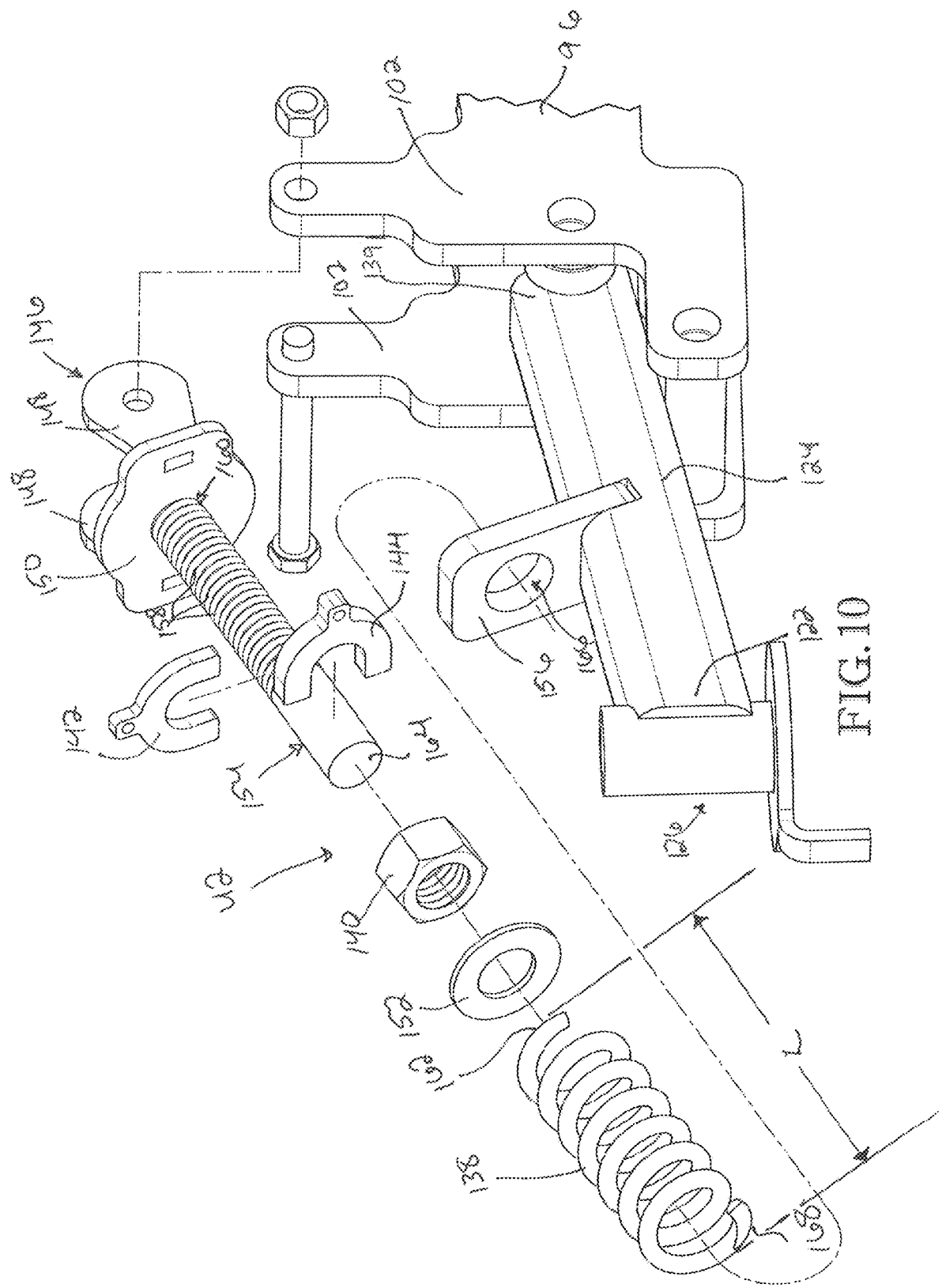
FIG. 10 is an enlarged, exploded perspective view of the spring assembly of FIGS. 8, 9a, 9b, and others.

Preferably, as shown in FIG. 10, formation of threads 158 on the rod 154 commences immediately adjacent the mounting plate 150 (i.e., at a proximal end 160 of the rod 154). The nut 140 is threaded onto the rod 154 via the threads 158, and the spring 138 coils around the rod 154 below (i.e., distal to) the nut 140. That is, the nut 140 is disposed between the mounting plate 150 and a proximal end 162 of the spring 138. In a preferred embodiment, washer 152 is preferably disposed between the nut 140 and the proximal end 162 of the spring 138.

The receiver 156 is fixed to the spring arm 124 in a position distal to the mounting plate 150. The rod 154 includes a distal end 164 that extends into an opening 166 in the receiver 156. As will be discussed in greater detail below, the opening 166 is preferably sized to facilitate a slip fit. The spring 138 includes a distal end 168 that abuts the mounting plate 150.

Figure 9A:
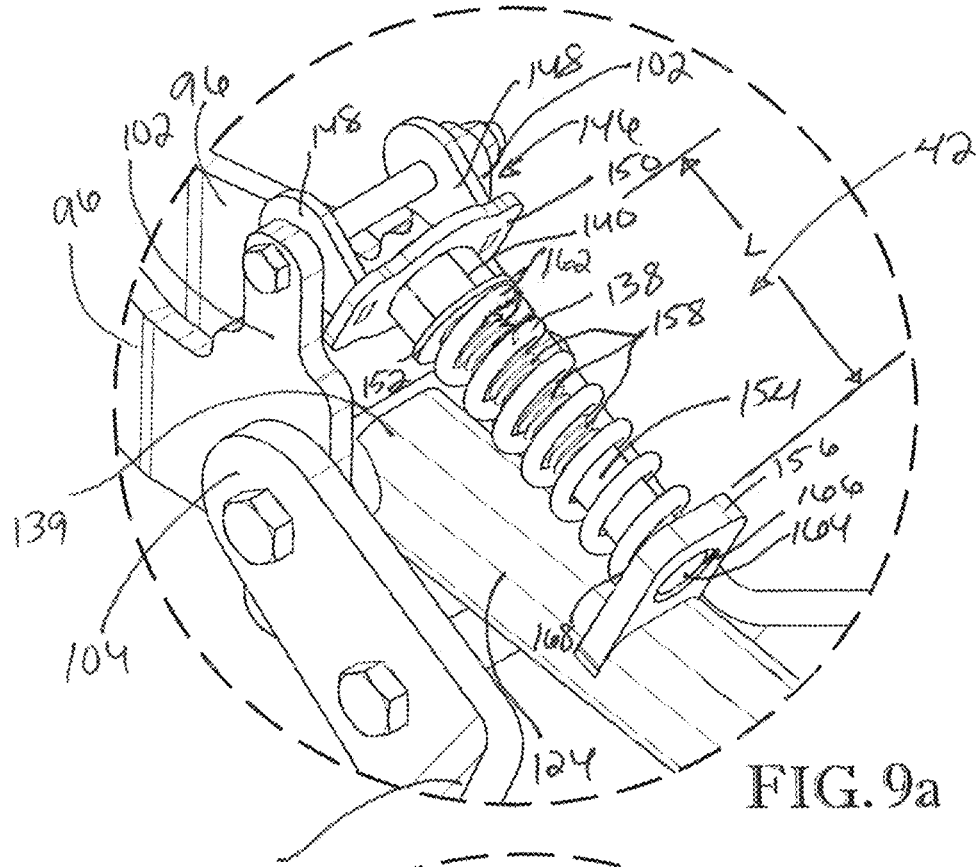
FIG. 9a is an enlarged perspective view of the spring assembly as shown in FIG. 8, particularly illustrating the spring in a most expanded configuration, such that the spring force resisting upward ground forces on the packer wheel is comparatively low.

FIG. 9a shows the packer force adjustment system 42 in a low-force configuration. The nut 140 directly abuts the mounting plate 150, the washer 152 directly abuts the nut 140, and the proximal end 162 of the spring 138 abuts the washer 152. The distal end 168 of the spring 138 abuts the receiver 156. The spring 138 is thus at a maximum length facilitated by the packer force adjustment system 42. Furthermore, the spring 138 is applying force against the nut 140, washer 152, and mounting plate 150 at its proximal end 162, and against the receiver 156 at its distal end 168. The spring force applied against the receiver 156 is in part (based on the relevant geometries) transferred via the spring arm 124 to the packer wheel arm 116 and, in turn, the packer wheel 56. The spring force is thus resistant against upward ground forces applied to the packer wheel 56.

Figure 9B:
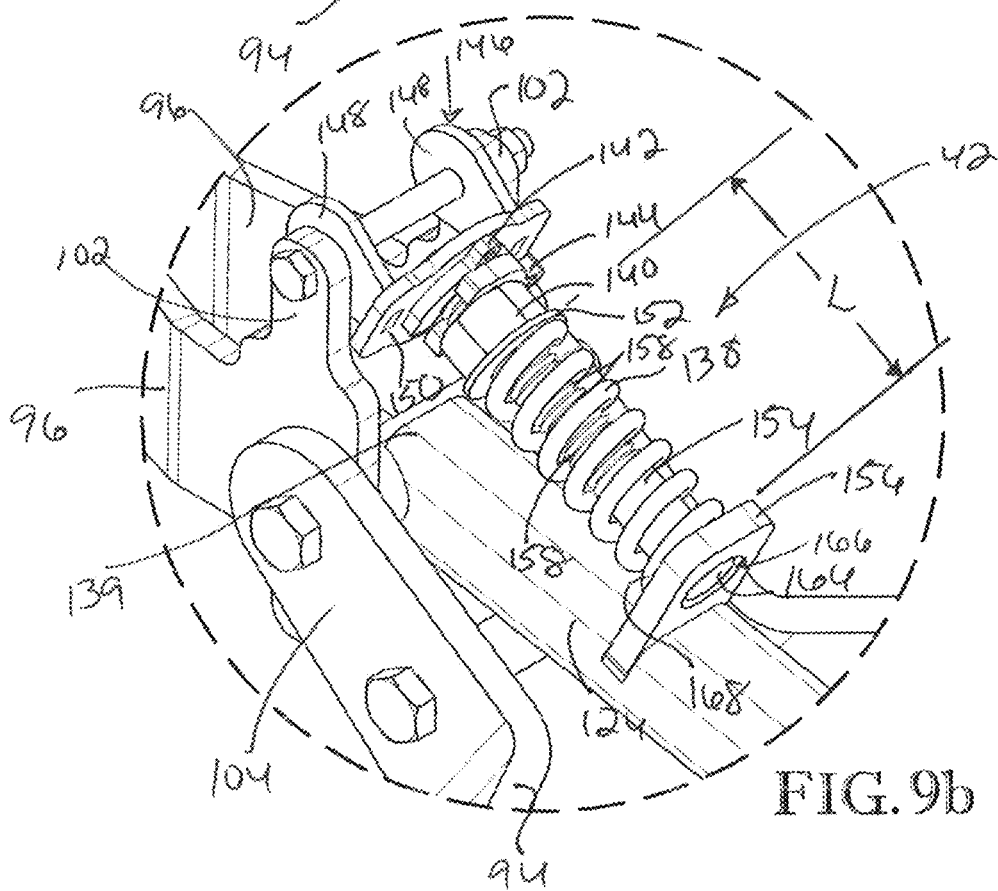
FIG. 9b is a perspective view of the spring assembly of FIG. 9a in an alternate setting or calibration in which the spring is in a more compressed configuration, such that the spring force resisting upward ground forces on the packer wheel is comparatively high.

In FIG. 9b, a second configuration generating a greater spring force is illustrated. More particularly, the nut 140 has been rotated downwardly/distally along the rod 154 via the threads 158 so as to shorten the length L of the spring 138. The spring force, as will be apparent to those of ordinary skill in the art, is proportional to the length L the spring 138, such that a shortened spring 138 as shown in FIG. 9b generates an increased spring force. Shims 142 and 144, placed between the nut 140 and the mounting plate 150, serve both to transfer force back to the mounting plate 150 and to enable shifting of the nut 140 by known increments (which may be used to calculate expected changes to the spring force).

In FIGS. 9a and 9b, the row unit 12 is illustrated in equilibrium. For instance, the upward ground forces generated against the packer wheel 56 are balanced by the spring force, the relevant component weights associated the with row unit 12, the packer force portion of the trailing force portion, and so on. Should the ground forces become sufficiently powerful, however, the packer wheel 56 and associated structures such as the packer wheel arm 116 and spring arm 124 would be urged to "fly up" or pivot upward and forward. In such a scenario, with the spring force overcome and the spring arm 124 thus pivoting, the distal end 164 of the rod 154 would shift distally/downwardly through the opening 166 (as allowed by the aforementioned slip fit). The spring force, upon decreasing ground forces, would thereafter push the spring arm 124 and, in turn, the packer wheel arm 116 and packer wheel 56, back down, with the distal end 164 of the rod 154 then retreating back to its equilibrium position within the opening.

It is particularly noted that the spring force is transferred only to the packer wheel 56, with the opener 46, the boot 72, and the crumbler wheels 54 being unaffected.

It is also noted that the threads 158 should extend along the rod 154 a sufficient length to enable full compression of the spring 138.

Finally, it is noted that numerous variations to the design of the packer force adjustment system 42 described above might be made without departing from the scope of the present invention. Among other things, for instance, a stopper might be added to the distal end of the rod to limit its extent through opening in the receiver. The rod might be fixed relative to the receiver and shiftable instead through the mounting plate. The entire rod rather than just the nut might be shiftable relative to the mounting plate and through the receiver (e.g., via threads) in order to change the spring length.

Although numerous specific advantages of the various features of the present invention have been described in detail above, it is also noteworthy that, in a general sense, such features and accompanying advantages enable operation of the implement 10 at higher speeds than conventional implements while maintaining quality results (e.g., without causing soil throw from one row unit 12 to land on an adjacent row, leading to inaccurate seeding depths). For instance, while conventional hoe drill implements might operate around four (4) to five (5) miles per hour, the implement 10 of the present invention is capable of high-quality operation at higher speeds of six (6) to seven (7) miles per hour.

Furthermore, the combination of the small soil particle sizes as achieved by the crumbler wheels 54, the accurate throw-back of soil into the trench or furrow as also achieved by the crumbler wheels 54, and the appropriate amount of combined packer force, as achieved in the manner described above, facilitates ultimate formation of a smooth field finish behind the implement 10. This smooth finish enables subsequent operations such as spraying and harvesting to be conducted at higher speeds and with decreased operator fatigue.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and access the reasonably fair scope of the present invention as pertains to any apparatus not materially departing from but outside the literal scope of the invention set forth in the following claims.

What is claimed is:

1. A row unit for a high-speed agricultural seeder, said row unit configured to dispense matter into soil while traveling in a forward direction across the ground, said row unit comprising:
    a leading system including an opener and a dispenser;
    a trailing system at least substantially disposed aft of the leading system,
    said trailing system including a leveler and a packer;
    a primary force generator configured to a generate a primary force; and
    a packer force adjustment system configured to generate a packer adjustment force,
    said opener configured to create a trench in the ground by displacing the soil,
    said dispenser configured to thereafter dispense the matter into the trench,
    said leveler configured to direct displaced soil back into the trench to cover the matter,
    said packer configured to thereafter traverse and compact soil within in the trench,
    said primary force being distributed through the leading system and the trailing system, such that an opener force portion of the primary force is transferred to the opener and a trailing force portion of the primary force is transferred the trailing system,
    said trailing force portion including a leveler force portion that is transferred to the leveler and a packer force portion that is transferred to the packer,
    said packer adjustment force being adjustable independently of the leveler force portion, such that a combined packer force equal to a sum of the packer force portion and the packer adjustment force is adjustable independent of the leveler force portion,
    said dispenser presenting an aftmost dispenser margin,
    said leveler comprising a wheel including a cleaning portion that extends forward of the aftmost dispenser margin to overlap the dispenser,
    said leveler force portion facilitating transmission of a positive rotational drive force from the soil to the wheel,
    said wheel being forcefully rotatable by said positive rotational drive force such that the cleaning portion actively and forcefully cleans the dispenser.

2. The row unit of claim 1,
    said primary force including a down force and a trip force,
    said down force configured to resist upward ground forces and said trip force configured to resist rearward ground forces.

3. The row unit of claim 2,
    said trip force including an opener trip force configured to resist rearward ground forces applied to the opener,
    said packer force portion being about one third of the opener trip force.

4. The row unit of claim 1,
    said primary force generator comprising a hydraulic actuator.

5. The row unit of claim 1,
    said primary force generator configured to generate a pressure between about 500 psi and about 1200 psi during operation of the seeder.

6. The row unit of claim 1,
    said combined packer force being between about 100 lb and about 200 lb during operation of the seeder.

7. The row unit of claim 1,
    said packer force adjustment system comprising a spring and a spring arm,
    said spring applying a spring force to the spring arm,
    said packer being linked to said spring arm such that the spring force is at least in part transferred to the packer to comprise the packer adjustment force.

8. The row unit of claim 7,
    said spring having a length extending along a spring axis,
    said force adjustment system further comprising a spring adjustment nut,
    rotation of said spring adjustment nut varying the length of the spring and thereby adjusting the spring force.

9. The row unit of claim 1, said leveler additionally configured as a depth gauge to control trench depth.

10. The row unit of claim 1,
    said wheel being a crumbler wheel including a rim and a plurality of teeth extending from the rim.

11. The row unit of claim 1, further comprising:
    a shank,
    said opener and said dispenser being fixed to said shank.

12. The row unit of claim 11,
    said opener being at least in part integrally formed with said shank.

13. The row unit of claim 12,
    said opener comprising a hoe including an edge configured to at least in part create the trench.

14. The row unit of claim 1,
    said dispenser comprising a boot configured for fluid communication with a source of the matter.

15. The row unit of claim 14,
    said boot being mounted adjacent the opener.

16. The row unit of claim 1,
    said packer comprising a rotatable wheel.

17. The row unit of claim 1,
said packer being mounted to said spring arm via a caster such that the packer is pivotable about an axis generally orthogonal the forward direction.
18. The row unit of claim 1,
said row unit further comprising a depth adjustment cam,
said depth adjustment cam facilitating vertical adjustment of the leveler,
said leveler additionally configured as a depth gauge to control trench depth.
19. The row unit of claim 1,
said cleaning portion presenting a fore-and-aft dimension that is between about 5% and about 25% of an overall diameter of the wheel.
20. The row unit of claim 10,
said cleaning portion including a plurality of said teeth.

\* \* \* \* \*